Dec. 13, 1960
T. E. LOHR ET AL
2,964,093
VEHICLE SEAT ADJUSTER
Filed July 30, 1958
3 Sheets-Sheet 1
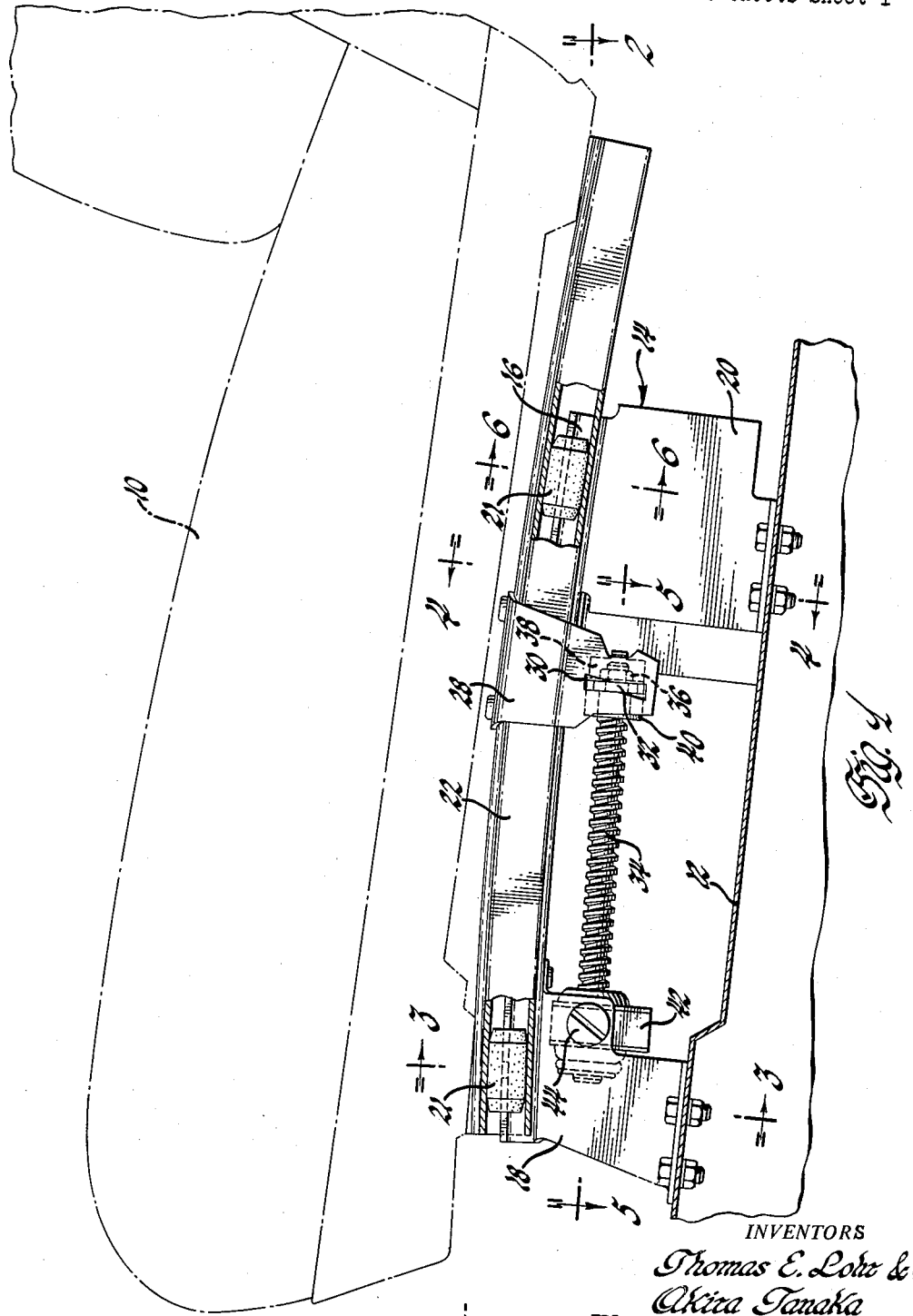
INVENTORS
Thomas E. Lohr &
Akira Tanaka
BY E. W. Christen
ATTORNEY

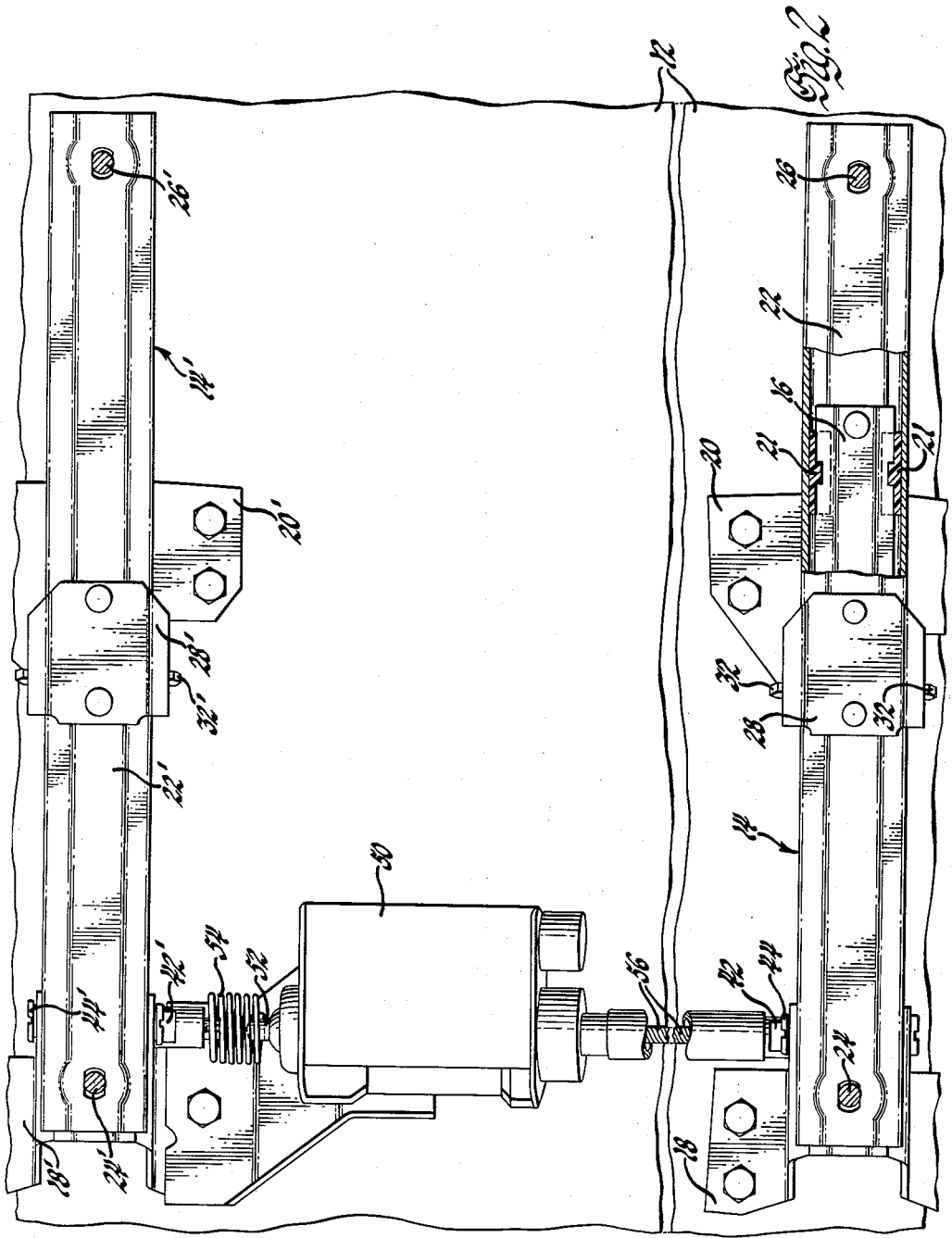

Dec. 13, 1960 T. E. LOHR ET AL 2,964,093
VEHICLE SEAT ADJUSTER
Filed July 30, 1958 3 Sheets-Sheet 3
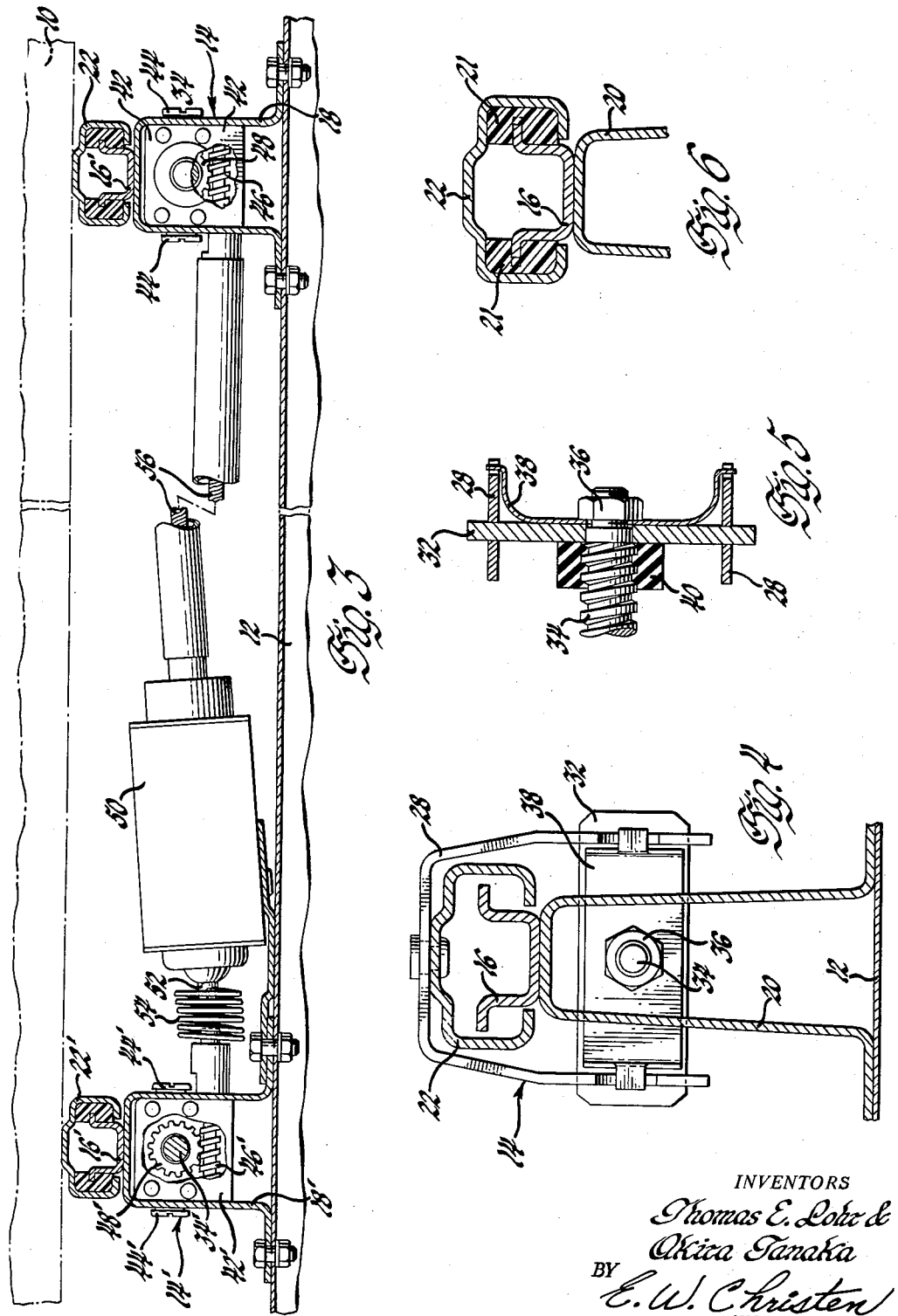
INVENTORS
*Thomas E. Lohr &
Okica Tanaka*
BY
*E. W. Christen*
ATTORNEY 2,964,093
Patented Dec. 13, 1960

2,964,093

VEHICLE SEAT ADJUSTER

Thomas E. Lohr and Akira Tanaka, Detroit, Mich., assignors to General Motors Corporation, Detroit, Mich., a corporation of Delaware Filed July 30, 1958, Ser. No. 752,130

2 Claims. (Cl. 155—14)

This invention relates to seat adjusters for vehicles and more particularly to a power-driven seat adjuster.

The front seats of vehicles are slidably mounted on spaced pairs of upper and lower tracks for fore and aft adjustment and in many cases a motor is provided to accomplish the adjustment. Various seat adjuster arrangements have been used; however, conventional designs are not satisfactory for low silhouette vehicles for as vehicles become lower the drive shaft tunnel that runs between the seat tracks occupies more of the vertical space between the floor and seat bottom thereby leaving little or no room in that area for the seat adjuster mechanism.

An object of the invention is to provide a power-driven seat adjuster mechanism which is economical in construction and which is arranged compactly in the seat track area and away from the drive shaft tunnel area.

Other objects of the invention will be apparent from the following description, reference being had to the accompanying drawings wherein the preferred form of the invention is shown.

In the drawings:

Figure 1 is a side elevational view, partially broken away, of the seat adjuster at the left side of the front seat of a vehicle;

Figure 2 is a plan view, taken substantially on the plane indicated by the line 2—2 of Figure 1, of the entire seat adjuster mechanism;

Figure 3 is a sectional view, partially broken away, taken substantially on a plane indicated by the line 3—3 of Figure 1;

Figure 4 is a sectional view taken substantially on a plane indicated by the line 4—4 of Figure 1;

Figure 5 is a sectional view taken substantially on the plane indicated by the line 5—5 of Figure 1; and Figure 6 is a sectional view taken substantially on the plane indicated by the line 6—6 of Figure 1.

Referring to the drawings, the front seat 10 of a vehicle is carried on the floor 12 by seat adjusters 14 and 14' at the left and right sides of the seat. The right adjuster 14' is similar to the left adjuster 14 and the like parts thereof are designated by prime numerals for convenience.

The seat adjuster 14 has a lower track 16 of generally U-shaped cross-section which is secured to the floor by U-shaped supports 18 and 20. The track 16 extends longitudinally of the vehicle and is curved slightly in the vertical plane so that the seat 10 will have a low reclined attitude in the aft position and a high upright attitude in the forward position. A plurality of bearing blocks 21 of nylon or other plastic material having anti-friction qualities are fixed to the lower track 16.

A generally C-sectioned upper track 22 is slidably secured to the lower track 16 by the bearing blocks 21. Since the upper track 22 embraces the lower track 16 on top and bottom as well as on either side, it is constrained to move along the lower track in the fore and aft direction.

The seat 10 is bolted to the upper track 22 at 24 and 26 and a U-shaped bracket 28 is secured on the upper track between the lower track supports 18 and 20. The bracket 28 extends below the tracks and has a slot 30 in each leg. A plate 32 extends across the legs of the bracket 28 and is received in the slots 30 thereof. The slot 30 is enlarged slightly at top and bottom so that the plate 32 will have limited swinging movement in the vertical plane. A lead screw 34 extends laterally below the tracks 16 and 22 and has its rearward end secured to the plate 32 by a nut 36, lock strip 38 and plastic bushing 40 which prevent the lead screw from rotating.

Drive housings 42 and 42' are pivotally supported across the supports 18 and 18' by bolts 44 and 44' so as to swing below the tracks in the vertical plane. The drive housings 42 and 42' rotatably mount worms 46 and 46' and pinion gears 48 and 48'. The gears 48 and 48' are internally threaded to receive the front ends of the drive screws 34 and 34'. Rotation of the worms and pinions in either direction will accordingly shift the lead screws 34 and 34' in fore and aft direction and thus move the upper tracks 22 and 22' by the plates 32 and 32'. A reversible drive electric motor 50 is mounted on the floor 12 adjacent the drive housing 42'. The motor shaft 52 is connected to the shaft portion of the worm 46' by a coil spring coupling 54 and to the shaft portion of the worm 46 by a flexible shaft 56 that crosses a drive shaft tunnel area. When the motor 50 is energized in either direction the pinions 48 and 48' are rotated to advance or retreat the lead screws 34 and 34' to thus move the upper tracks and seat in fore and aft direction.

As previously noted, the seat tracks 16 and 22 are curved slightly in a circular arc in the vertical plane. The lead screws 34, being straight, must be able to swing slightly in the vertical plane as it advances and retreats. The pivotal support at 44 for the drive housing 42 and the pivotal support for the plate 32 accommodate such slight swinging movement of the lead screw 34. By providing a separate drive gear for each adjuster, coordinated movement between the right and left tracks is achieved without the use of bulky coordinating linkages and by locating the drive gears below the tracks, maximum drive shaft tunnel space between the adjusters is obtained.

While the embodiment of the invention here described is preferred, it is understood that modifications may be made by the exercise of skill in the art which will lie within the scope of the invention.

We claim:

1. A seat adjuster comprising a lower track having a slight curvature in the vertical plane, an upper track of complementary curvature secured to the lower track for sliding movement in fore and aft direction and restrained against movement in other directions, a support of generally U-shaped cross-section secured to the underside of the lower track, a bracket of generally U-shaped cross-section secured to the upper track and extending below the tracks, a plate secured across the bracket below the tracks for limited swinging movement in the vertical plane, a housing below the tracks and pivoted across the support to swing in the vertical plane, a drive gear with an internal thread rotatably supported in the housing, and a lead screw extending longitudinally below the tracks, one end of the lead screw being secured against rotation by the plate and the other end being threaded in the drive gear whereby rotation of the drive gear will shift the lead screw and upper track in fore and aft direction.

2. A seat adjuster comprising plastic bearing blocks, a lower track having a slight curvature in the vertical plane and having a generally U-shaped cross-section, an upper track of complementary curvature and generally C-shaped cross-section secured to the lower track on the plastic bearing blocks for sliding movement in fore and aft direction and restrained against movement in other directions, a support of generally U-shaped cross-section secured to the underside of the forward portion of the lower track, a bracket of generally U-shaped cross-section secured to the upper track rearward of the support and extending below the tracks, a plate secured across the bracket below the tracks for limited swinging movement in the vertical plane, a housing below the tracks and pivoted across the support to swing in the vertical plane, a drive gear with an internal thread rotatably supported in the housing, and a lead screw extending longitudinally below the tracks, the rear end of the lead screw being secured against rotation by the plate and the front end being threaded in the drive gear whereby rotation of the drive gear will shift the lead screw and upper track in fore and aft direction.

References Cited in the file of this patent

UNITED STATES PATENTS

| | | |
|---|---|---|
| 1,647,522 | Hoffer et al. | Nov. 1, 1927 |
| 1,921,224 | Floraday | Aug. 8, 1933 |
| 1,961,653 | Van Deest | June 5, 1934 |
| 2,172,941 | Manning et al. | Sept. 12, 1939 |
| 2,682,912 | Johnson et al. | July 6, 1954 |
| 2,765,024 | Brundage | Oct. 2, 1956 |